(12) United States Patent
Geng et al.

(10) Patent No.: US 12,555,615 B2
(45) Date of Patent: Feb. 17, 2026

(54) STORAGE SERVER

(71) Applicants: SQ TECHNOLOGY (SHANGHAI) CORPORATION, Shanghai (CN); INVENTEC CORPORATION, Taipei (TW)

(72) Inventors: Zhao Geng, Shanghai (CN); Guangzhao Tian, Shanghai (CN); Kangguang Zhu, Shanghai (CN); Hong-Chou Lin, Taipei (TW); Yu-Fan Chen, Taipei (TW)

(73) Assignees: SQ TECHNOLOGY (SHANGHAI) CORPORATION, Shanghai (CN); INVENTEC CORPORATION, Taipei (TW)

( * ) Notice: Subject to any disclaimer, the term of this patent is extended or adjusted under 35 U.S.C. 154(b) by 111 days.

(21) Appl. No.: 18/757,752

(22) Filed: Jun. 28, 2024

(65) Prior Publication Data
US 2025/0378853 A1 Dec. 11, 2025

(30) Foreign Application Priority Data
Jun. 5, 2024 (CN) .......................... 202410726889.5

(51) Int. Cl.
*H05K 7/14* (2006.01)
*G06F 1/18* (2006.01)
*G06F 1/183* (2026.01)
*G11B 33/12* (2006.01)

(52) U.S. Cl.
CPC ............ *G11B 33/128* (2013.01); *G06F 1/183* (2013.01); *H05K 7/1489* (2013.01)

(58) Field of Classification Search
CPC ...................................................... G06F 1/183
See application file for complete search history.

(56) References Cited

U.S. PATENT DOCUMENTS

2005/0257232 A1* 11/2005 Hidaka ................. G11B 33/126
2022/0366939 A1* 11/2022 Geng ....................... G06F 1/187

* cited by examiner

*Primary Examiner* — Jerry Wu

(57) ABSTRACT

A storage server includes a casing provided with a casing cavity and a front opening, a storage assembly including a storage tray, two storage units, and two hard disk backplanes, and a computing assembly. The storage tray is slidably connected to the casing and is capable of moving into and out of the casing cavity in a first direction through the front opening, the storage tray is provided with a storage cavity. Each hard disk backplane is located on a side of the corresponding storage unit in the first direction, each storage unit includes a plurality of hard disks arranged along a second direction, each hard disk is pluggably received in the storage cavity. The computing assembly is received in the casing cavity and is stacked with the storage assembly in a third direction perpendicular to both the first direction and the second direction.

10 Claims, 10 Drawing Sheets

STORAGE SERVER

CROSS-REFERENCE TO RELATED APPLICATIONS

This application claims priority of Chinese Patent Application No. 202410726889.5, filed on Jun. 5, 2024, entitled "STORAGE SERVER", the entire content of which is incorporated herein in its entirety.

TECHNICAL FIELD

The present disclosure relates to the technical field of servers, and in particular to a storage server.

BACKGROUND

With the rapid development of emerging technologies such as the internet, cloud computing and big data, the data processed by the server is growing at an alarming rate, which leads to higher and higher requirements for the storage density of server. Therefore, servers need to be able to store more hard disks to provide sufficient storage capacity to satisfy the requirements for the service.

However, since an available mounting space of the server is constant, when the number of hard disks is increased to satisfy the storage density, an available mounting space for computing assemblies of the server will be reduced, which will affect a data processing speed of the server. Therefore, how to effectively improve the storage density of the storage server without affecting the computing performance of the computing assembly has become one of the urgent problems to be solved.

SUMMARY

According to various embodiments, a storage server is provided.

A storage server includes a casing provided with a casing cavity and a front opening in communication with the casing cavity; a storage assembly including a storage tray, at least two storage units, and at least two hard disk backplanes, wherein the storage tray is slidably connected to the casing and is capable of moving into and out of the casing cavity in a first direction through the front window, the storage tray is provided with a storage cavity, the at least two hard disk backplanes are spaced apart along the first direction in the storage cavity, at least two hard disk backplanes and the at least two storage units are provided in a one-to-one correspondence, each hard disk backplane is located on a side of the corresponding storage unit in the first direction, each storage unit includes a plurality of hard disks arranged along a second direction, each hard disk is pluggably received in the storage cavity and is electrically connected to the corresponding hard disk backplane, and the second direction forms an angle with the first direction; and a computing assembly received in the casing cavity and is stacked with the storage assembly in a third direction perpendicular to both the first direction and the second direction, wherein the computing assembly includes a computing tray connected to the casing and a motherboard provided on the computing tray and electrically connected to the at least two hard disk backplanes.

In one of the embodiments, the storage tray includes a support plate extending along the first direction and two side plates respectively provided on opposite sides of the support plate in the second direction to form the storage cavity, the storage server further includes at least two adapter plates, each adapter plate is pluggably provided on the support plate along the second direction, each adapter plate is electrically connected to the motherboard, each adapter plate includes a first golden finger, each hard disk backplane includes a second golden finger electrically connected to the first golden finger, the at least two adapter plates and the at least two hard disk backplanes are in a one-to-one correspondence.

In one of the embodiments, the computing assembly includes a host bus adapter provided on the motherboard and electrically connected to the motherboard, the storage server further includes a cable fixing base removably mounted on the support plate along the first direction, the cable fixing base includes at least two third golden fingers spaced apart along the first direction, each adapter plate includes a fourth golden finger, the at least two third golden fingers are electrically connected to fourth golden fingers of the at least two adapter plates in a one-to-one correspondence, and each third golden finger is connected to the host bus adapter through a cable.

In one of the embodiments, the computing assembly includes a signal relay provided on the computing tray and electrically connected to the motherboard, the storage server further includes a cable fixing base removably mounted on the support plate along the first direction, the cable fixing base includes at least two third golden fingers spaced apart along the first direction, each adapter plate includes a fourth golden finger, the at least two third golden fingers are electrically connected to fourth golden fingers of the at least two adapter plates in a one-to-one correspondence, and each third golden finger is connected to the signal relay through a cable.

In one of the embodiments, the storage server further includes a cable management frame received in the casing cavity and located at a side of the storage assembly away from the front opening, the cable is provided on the cable management frame, the cable management frame includes a plurality of frame bodies that are sequentially hinged, two frame bodies located at opposite ends of the cable management frame are hinged to the casing and the storage tray respectively, and the storage tray is capable of driving the plurality of frame bodies to be folded or unfolded when moving along the first direction relative to the casing.

In one of the embodiments, the storage assembly includes at least two backplane support plates connected to the at least two hard disk backplanes in a one-to-one correspondence, two ends of each backplane support plate are connected to the corresponding storage tray, the storage unit further includes a plurality of hard disk assemblies arranged along the second direction, each hard disk assembly is pluggably received in the storage cavity, each hard disk assembly includes a mounting bracket, an elastic member, a pressing member, and the hard disk, the mounting bracket is engaged with the corresponding backplane support plate, the mounting bracket is provided with a first opening and a first mounting position that are in communication with each other, the hard disk is capable of moving into and out of the first mounting position through the first opening, one end of the elastic member is provided on the mounting bracket, another end of the elastic member includes an engagement portion, the pressing member is movably provided on the mounting bracket and is configured to press the engagement portion, the hard disk includes a locking portion, and the engagement portion is configured to be locked with or unlock from the locking portion.

In one of the embodiments, the hard disk assembly further includes a fixing bracket and a frame body, the fixing bracket is capable of moving into and out of the first mounting position through the first opening, the frame body is detachably provided on the fixing bracket and is provided with a second opening and a second mounting position that are communication with each other, and the hard disk is capable of moving into and out of the second mounting position through the second opening.

In one of the embodiments, four storage units and four hard disk backplanes are provided, the four storage units are evenly spaced apart in the storage cavity along the first direction, and each storage unit includes fifteen hard disks arranged along the second direction.

In one of the embodiments, the computing assembly further includes an expansion module, the expansion module includes an expansion bracket and an expansion assembly, the expansion bracket is provided on the computing tray and is located on a side of the motherboard adjacent to the front opening, the expansion bracket is provided with a first mounting opening and a first mounting cavity that are in communication with each other, the first mounting opening is located on a side of the first mounting cavity away from the motherboard and is communication with the front opening, the expansion assembly is detachably mounted in the first mounting cavity through the first mounting opening and is electrically connected to the motherboard, and the expansion assembly includes an extension interface on a side thereof facing the first mounting opening configured to be connected to an external device.

In one of the embodiments, the casing is further provided with a rear opening in communication with the casing cavity and opposite to the front opening, the storage server further includes a heat dissipation assembly, the heat dissipation assembly includes a heat dissipation bracket and a fan assembly, the heat dissipation bracket is received in the casing cavity and is located on a side of the storage assembly and a side of the computing assembly that are both adjacent to the rear opening, the heat dissipation bracket is provided with a second mounting cavity extending therethrough along the first direction, the fan assembly is detachably mounted in the second mounting cavity, and the fan assembly is configured to draw airflow from the casing cavity or blow airflow into the casing cavity through the rear opening.

In one of the embodiments, a cavity wall of the second mounting cavity is provided with an assembly groove, the fan assembly includes a fan body and an assembly member rotatably provided on the fan body, the fan body is capable of moving into and out of the second mounting cavity through an end of the second mounting cavity adjacent to the rear opening, a rotation plane of the assembly member is parallel to a mounting direction and a removing direction of the fan body, and the assembly member includes an assembly protrusion at an end thereof engaged in the assembly groove and abutting against a side wall of the assembly groove away from the storage assembly.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF REFERENCE SIGNS

Figure 1:
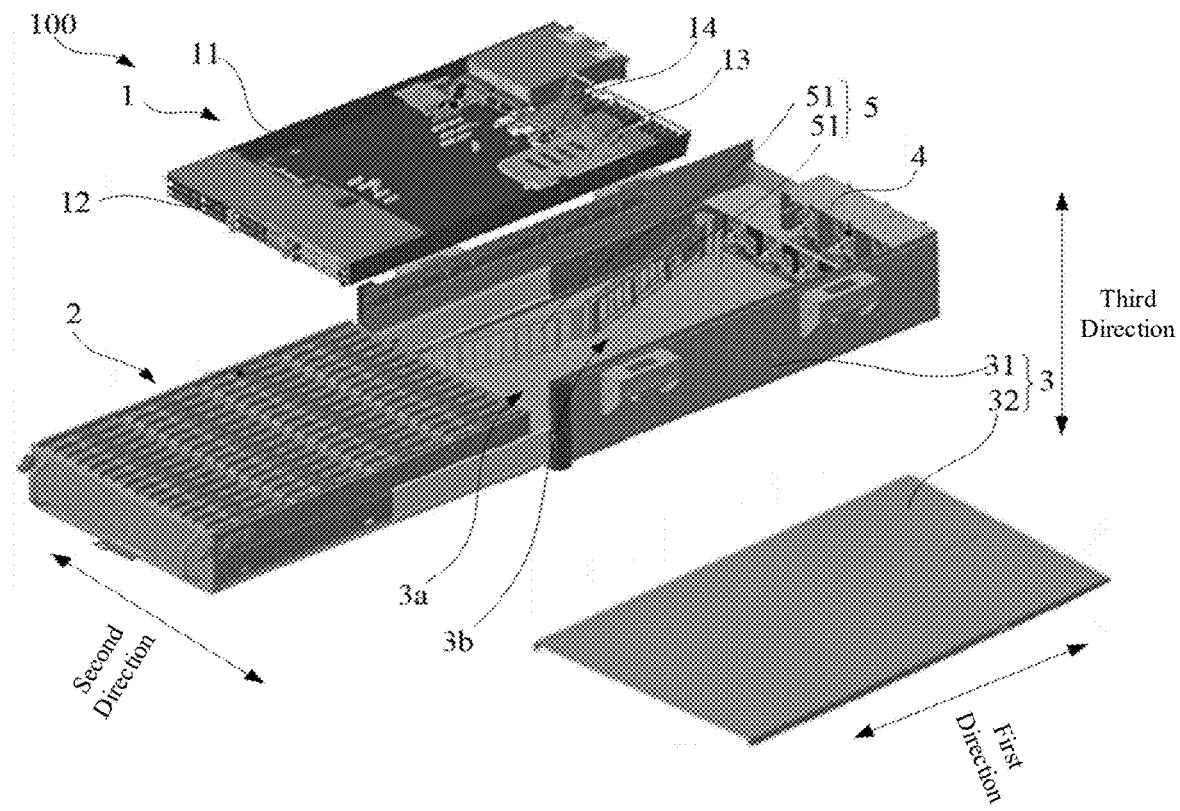
FIG. 1 is an exploded view of a storage server according to an embodiment of the present disclosure.

100. Storage server; 1. Computing assembly; 11. Computing tray; 12. Expansion module; 121. Expansion bracket; 121a. First mounting opening; 121b. First mounting chamber; 122. Expansion assembly; 13. Host bus adapter; 14. Signal relay; 15. Motherboard; 16. Adapter bracket; 161. Support base; 161a. Support position; 161b. Support opening; 6162. Locking base; 163. Locking mechanism; 164. Clamping bracket; 164a. Clamping portion; 2. Storage assembly; 21. Storage tray; 21a. First fitting portion; 21b. Storage cavity; 21c. Connecting port; 21d. Adapter groove; 21f. Cable slot; 211. Side plate; 212. Support plate; 212a. First end surface; 212b. Second end surface; 213. Edge plate; 214. Handle; 22. Storage unit; 3. Casing; 3a. Front opening; 3b. Casing cavity; 3C. Rear opening; 31. Casing base; 32. Cover plate; 33. Second fitting portion; 4. Heat dissipation assembly; 41. Heat dissipation bracket; 41a. Second mounting cavity; 41b. Assembly groove; 42. Fan assembly; 421. Fan body; 422. Assembly member; 422a. Assembly protrusion; 5. Cable management frame; 51. Frame body; 6. Hard disk assembly; 61. Assembly frame; 61a. First opening; 61b. First mounting position; 62. Fixing bracket; 63. Frame body; 63a. Second mounting position; 63b.

Second opening; 64. Hard disk; 641. Locking portion; 65. Air guiding cover; 66. Elastic member; 661. Engagement portion; 67. Pressing member; 7. Hard disk backplane; 71. Backplane connector; 72. Backplane support plate; 74. Hard disk groove; 8. Adapter plate; 8a. Adapter support plate; 81. Fourth golden finger; 82. First golden finger; 9. Cable fixing base; 91. Third golden finger.

DETAILED DESCRIPTION OF THE EMBODIMENTS

In order to make the above objects, features and advantages of the present disclosure clear and easier to understand, the specific embodiments of the present disclosure are described in detail below in combination with the accompanying drawings. Many specific details are set forth in the following description to facilitate a full understanding of the present disclosure. However, the present disclosure can be implemented in many ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which are only for the convenience of describing the present disclosure and simplifying the description, rather than indicating or implying that the device or element must have a specific azimuth, be constructed and operated in a specific azimuth, so such terms cannot be understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "a plurality of" means at least two, such as two, three, etc., unless otherwise expressly and specifically defined.

In the present disclosure, unless otherwise expressly specified and limited, the terms "mount", "connect", "contact", "fix" and other terms should be understood in a broad sense, for example, they can be fixed connections, detachable connections, or integrated. They can be mechanical connection or electrical connection. They can be directly connected or indirectly connected through an intermediate medium. They can be the connection within two elements or the interaction relationship between two elements, unless otherwise expressly limited. For those skilled in the art, the specific meaning of the above terms in the present disclosure can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

Referring to FIGS. 1 to 3, and FIG. 6, a storage server 100 is provided according to an embodiment of the present disclosure. The storage server 100 includes a casing 3, a storage assembly 2, and a computing assembly 1.

The casing 3 is provided with a casing cavity 3b and a front opening 3a in communication with the casing cavity 3b. The storage assembly 2 includes a storage tray 21, at least two storage units 22, and at least two hard disk backplanes 7. The storage tray 21 is slidably connected to the casing 3 and is capable of moving into and out of the casing cavity 3b in a first direction through the front opening 3a. The first direction is a direction in which the storage tray 21 is pushed into or pulled out of the casing cavity 3b. The storage tray 21 is provided with a storage cavity 21b. The at least two hard disk backplanes 7 are spaced apart along the first direction and are provided in the storage cavity 21b. The at least two hard disk backplanes 7 and the at least two storage units 22 are provided in a one-to-one correspondence. Each hard disk backplane 7 is located on a side of the corresponding storage unit 22 in the first direction. Each storage unit 22 includes a plurality of hard disks 64 arranged along a second direction, and the second direction forms an angle with the first direction. In an embodiment, the second direction is perpendicular to the first direction. Each hard disk 64 is pluggably received in the storage cavity 21b and is electrically connected to the corresponding hard disk backplane 7. The computing assembly 1 is received in the casing cavity 3b, and is stacked with the storage assembly 2 in a third direction perpendicular to both the first direction and the second direction. The computing assembly 1 includes a computing tray 11 connected to the casing 3 and a motherboard 15 provided on the computing tray 11 and electrically connected to the at least two hard disk backplanes 7.

According to the aforementioned storage server 100, the at least two hard disk backplanes 7 are arranged in the first direction, the hard disk backplanes 7 and the storage units 22 are provided in a one-to-one correspondence, the hard disk backplanes 7 and the corresponding storage units 22 are arranged in the first direction, and the at least two storage units 22 are also arranged in the first direction. Therefore, when each storage unit 22 includes the plurality of hard disks 64 arranged in the second direction, the hard disks 64 in the storage server 100 are arranged in multiple rows and multiple columns in the storage cavity 21b. Compared with the conventional storage server in which a storage assembly includes multiple layers of storage trays stacked in the third direction and a plurality of hard disks of each layer of storage tray are laid in the storage cavity, the storage server 100 according to aforementioned embodiment can sufficiently utilize a space occupied by the storage assembly 2 to arrange more hard disks 64, so as to effectively improve a storage density.

Moreover, since the storage units 22 and the corresponding hard disk backplanes 7 are arranged along the first direction, i.e., the hard disks 64 and the corresponding hard disk backplanes 7 are also arranged along the first direction, the hard disks 64 can be mounted in the storage cavity 21b in a side vertical placement manner and a size of the hard disks 6 in the third direction is less than 3 U (U is a size unit of the server). Therefore, when a height of the server is 4 U, compared with the conventional storage assembly in which the hard disks are vertically arranged, i.e., the hard disk backplanes and the hard disks are arranged along the third direction, the storage assembly 2 according to aforementioned embodiment can save 1 U of space in the third direction, so that the storage server 100 has enough space to arrange the computing assembly 1, thereby effectively ensuring the computing performance of the storage server 100.

Accordingly, the storage server 100 provides a dense solution with high availability, through which not only the storage density of the storage server 100 can be effectively improved, but also the computing performance of the computing assembly 1 in the storage server 100 can be effectively ensured. Therefore, the storage server 100 can provide storage expansion with low power consumption, high capacity, and high availability for a data center, so that the storage server 100 can be applied to application scenarios such as cold storage, video surveillance, storage, and big data. In addition, since the storage tray 21 is slidably connected to the casing 3, and the storage tray 21 can be pulled out of the casing cavity 3b from the front opening 3a, when the hard disk 64 is required to be maintained, only the storage tray 21 needs to be moved out of the casing cavity 3b relative to the casing 3 in the first direction, and then the hard disk 64 to be maintained can be hot-plugged, so as to improve the working efficiency in the maintenance process.

Figure 3:
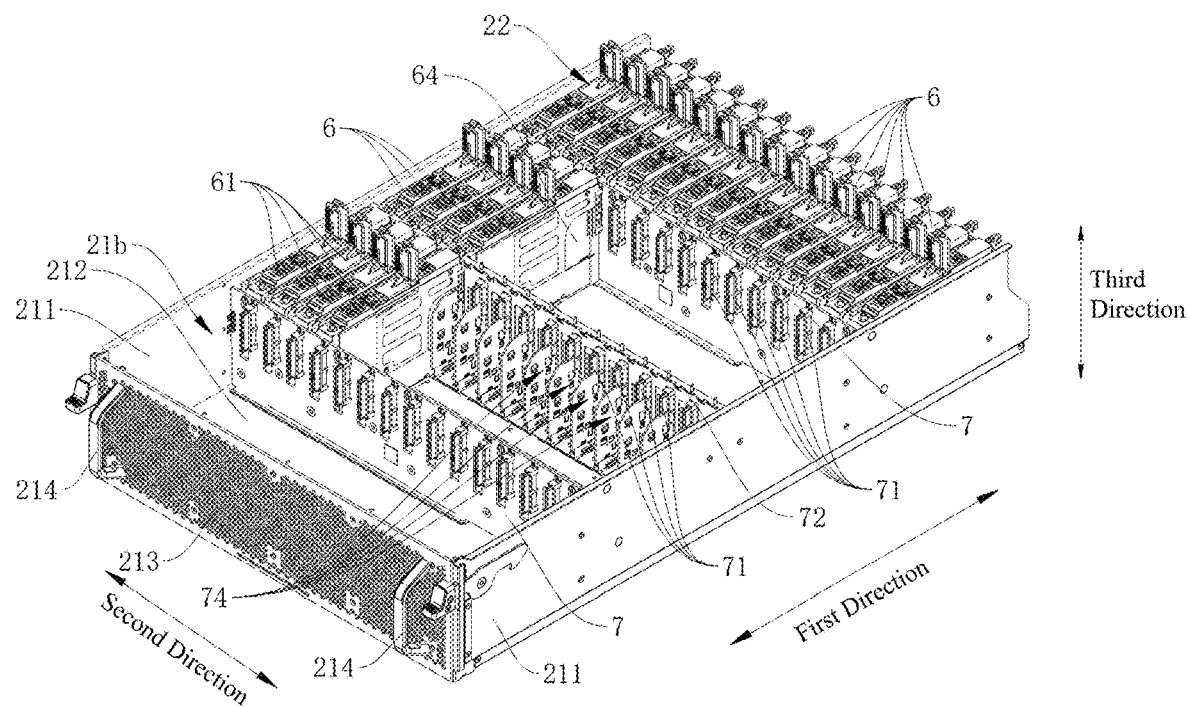
FIG. 3 is a perspective view illustrating the storage assembly assembled in the casing according to an embodiment.

Specifically, as shown in FIG. 3, each hard disk 64 includes a hard disk connector (not shown). Each hard disk backplane 7 includes a plurality of backplane connectors 71 arranged along the second direction, and the plurality of backplane connectors 71 are electrically connected to the plurality of hard disk connectors in the corresponding storage unit 22 in a one-to-one correspondence. The hard disk 64 adopts hot-plugging technology to facilitate convenient disassembly and assembly with the hard disk backplane 7, which improves disassembly and assembly efficiency and shortens operation and maintenance time. At the same time, the hard disk 64 can support independent power on and off control.

Specifically, the hard disk 64 may be a 3.5-inch hard disk, or may be a U.2 solid state disk or an E3.S solid state disk, etc., so that the storage server 100 can provide the latest SAS 12 Gb/s performance, high availability, and hot-pluggable components to satisfy a big data bandwidth storage requirement.

Figure 2:
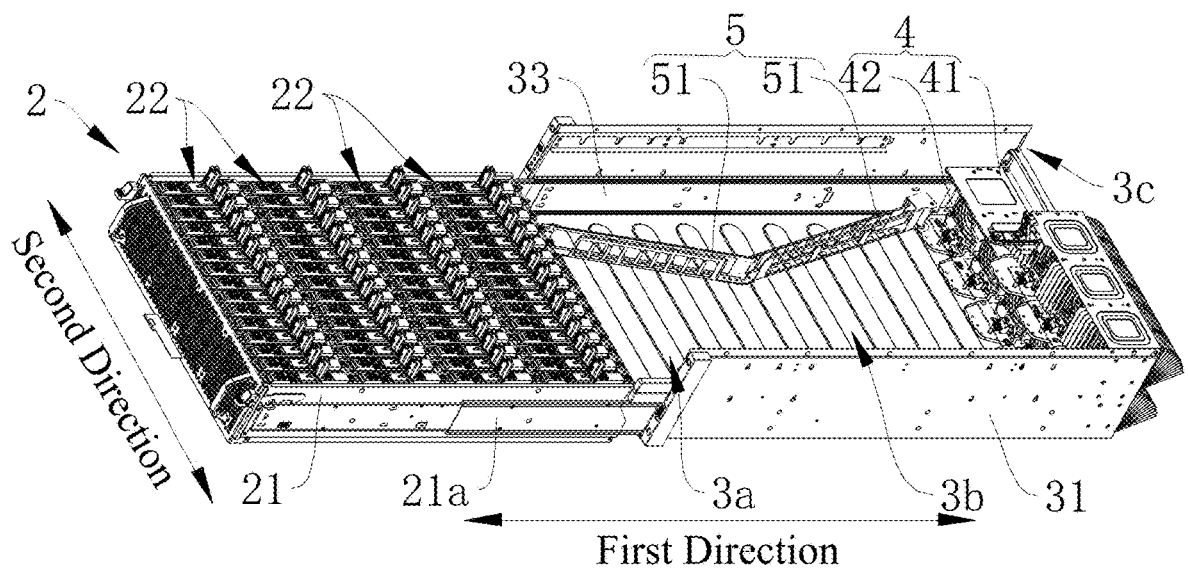
FIG. 2 is a perspective view of a storage assembly located out of a casing according to an embodiment.

In an embodiment, referring to FIG. 1 and FIG. 2, the casing 3 may include a casing base 31 and a cover plate 32 detachably provided on the casing base 31. The cover plate 32 and the casing base 31 cooperatively form the casing cavity 3b.

Further, referring to FIG. 2, the storage tray 21 includes a first fitting portion 21a extending in the first direction, and a side wall of the casing cavity 3b is provided with a second fitting portion 33 slidably fitted with the first fitting portion 21a. In this way, the storage tray 21 can easily slide relative to the casing 3, so that the storage assembly 2 can move into and out of the casing cavity 3b through the front opening 3a, so as to facilitate the operation and maintenance of the storage assembly 2.

Specifically, in an embodiment, referring to FIG. 2, the storage tray 21 includes a support plate 212 and two side plates 211 connected to the support plate 212. Each of the two side plates 211 is provided with one first fitting portion 21a, the side wall of the casing cavity 3b is provided with two second fitting portions 33, and the first fitting portions 21a and the second fitting portions 33 are slidably connected in a one-to-one correspondence. In another embodiment, the first fitting portion 21a may also be provided on the support plate 212. The second fitting portion 33 may be provided on the side wall of the casing cavity 3b opposite to the support plate 212, so as to be connected to the first fitting portion 21a. In an embodiment, one of the first fitting portion 21a and the second fitting portion 33 may be a sliding groove, and the other one of the first fitting portion 21a and the second fitting portion 33 may be a sliding rail.

In order to ensure that each hard disk 64 in the storage assembly 2 can be hot-plugged for maintenance, when the storage tray 21 moves out of the casing cavity 3b to the farthest position relative to the casing 3, each hard disk 64 in the storage assembly 2 is located out of the casing cavity 3b, so that the user can conveniently remove the hard disk 64 to be maintained, thereby achieving convenient maintenance. For example, when four storage units 22 are provided, the storage tray 21 can move out of the casing 3 by a distance of 670 mm through the fitting of the first fitting portion 21a and the second fitting portion 33, so as to ensure the hot-plugged maintenance of the hard disk 64 in the last row.

A position relationship between the hard disk backplane 7 and the corresponding storage unit 22 can be configured as required. For example, the hard disk backplanes 7 are located on the same side of the corresponding storage unit 22. In an embodiment, as shown in FIG. 3, all of the hard disk backplanes 7 are located on a side of the corresponding storage unit 22 adjacent to or away from the front opening 3a. Alternatively, a part of the hard disk backplanes 7 may be located on a side of the corresponding storage unit 22 adjacent to the front opening 3a, and the rest hard disk backplanes 7 may be located on a side of the corresponding storage unit 22 away from the front opening 3a. For example, the hard disk backplane 7 extends along the second direction, which can effectively ensure that each hard disk 64 can be reliably connected to the corresponding hard disk backplane 7 when the hard disks 64 in the storage cavity 21b are placed in a side vertical placement manner.

In an embodiment, referring to FIG. 2 to FIG. 5, four storage units 22 and four hard disk backplanes 7 are provided. The four storage units 22 are evenly spaced apart and are provided in the storage cavity 21b along the first direction. Each storage unit 22 includes fifteen hard disks 34 arranged along the second direction. In this way, sixty hard disks 64 can be densely arranged in the storage server 100, so that the storage server 100 can provide a flexible and ultra-large-capacity local storage capability while ensuring the computing performance, so as to provide the required storage capacity for the data center and satisfy the storage requirements of the big data bandwidth, and further enable the storage server 100 to be applicable to application scenarios such as cold storage, video monitoring, storage, and big data.

Figure 4:
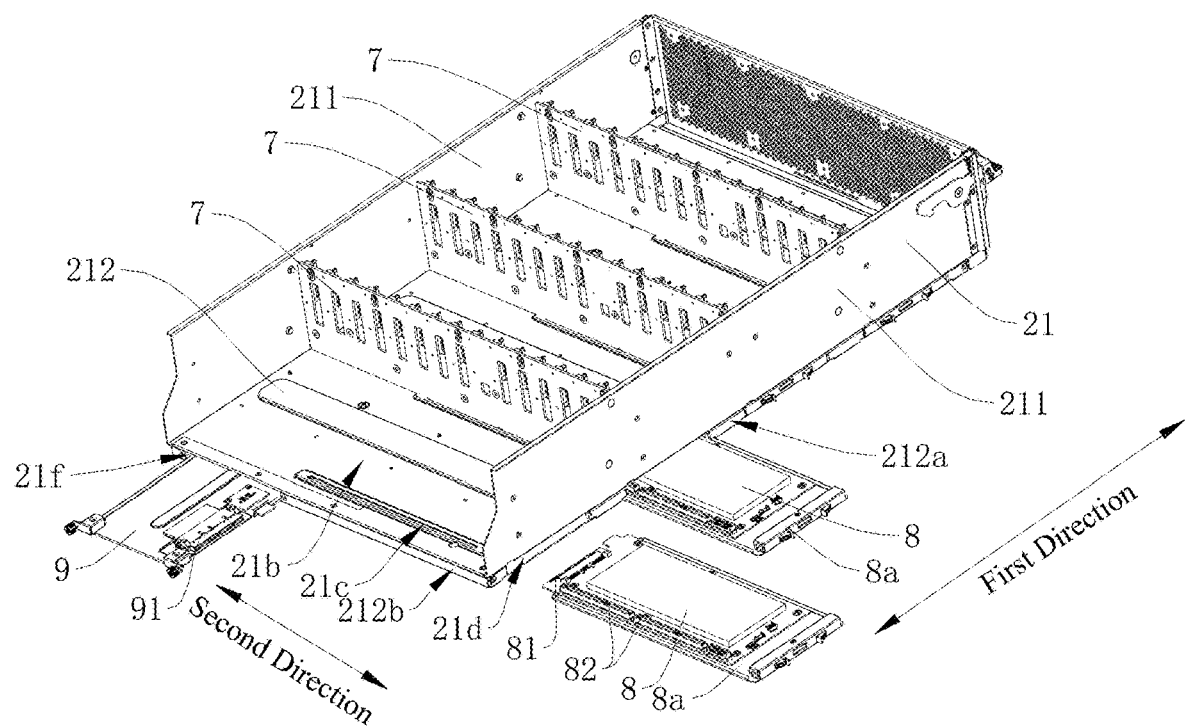
FIG. 4 is a perspective view illustrating a hard disk backplane, an adapter plate, and a cable fixing base to a storage tray according to an embodiment.
Figure 5:
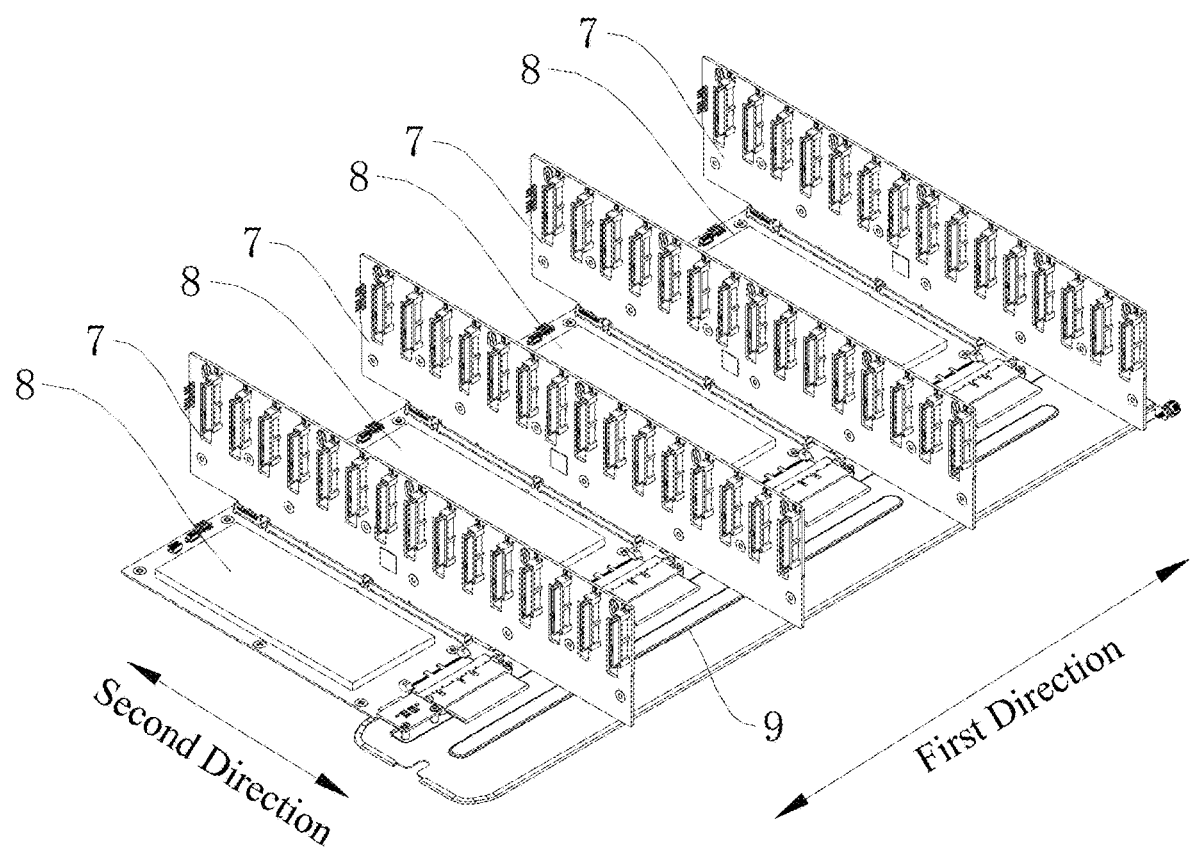
FIG. 5 is a perspective view illustrating he hard disk backplane, the adapter plate, and the cable fixing base according to an embodiment.

In an embodiment, referring to FIG. 1, FIG. 4 and FIG. 5, the storage tray 21 includes a support plate 212 and two side plates 211. The support plate 212 extends along the first direction, and the two side plates 211 are respectively provided on opposite sides of the support plate 212 in the second direction. The support plate 212 and the two side plates 211 cooperatively form the storage cavity 21b. The storage server 100 further includes at least two adapter plates 8. Each adapter plate 8 is pluggably provided on the support plate 212 along the second direction. Each adapter plate 8 is electrically connected to the motherboard 15 and includes a first golden finger 82. Each hard disk backplane 7 includes a second golden finger electrically connected to the first golden finger 82. The adapter plates 8 and the hard disk backplanes 7 are in a one-to-one correspondence. In this way, the arrangement of the adapter plate 8 can ensure the reliability of data transmission between the motherboard 15 and the hard disk backplane 7, and ensure that the server can achieve corresponding functions. The adapter plate 8 is electrically connected to the corresponding hard disk backplane 7 through the first golden finger 82 and the second golden finger, that is, the adapter plate 8 is electrically connected to the hard disk backplane 7 in a board-to-board manner without additionally arranging a cable between the adapter plate 8 and the corresponding hard disk backplane 7, which can ensure lower signal loss and transmission loss during data transmission. At the same time, since the adapter plate 8 is pluggably provided on the support plate 212, the adapter plate 8 can be separately plugged and unplugged for maintenance as an independent module. Specifically, when the adapter plate 8 is unplugged in the second direction, the adapter plate 8 can quickly be electrically disconnected from the corresponding hard disk backplane 7 and moved out of the support plate 212, so as to improve the maintenance efficiency. When the adapter plate 8 is plugged in the second direction at a predetermined position, the first golden finger 82 in the adapter plate 8 can be conveniently and electrically connected to the second golden finger in the corresponding hard disk backplane 7, so that data transmission can be achieved between the adapter plate 8 and the hard disk backplane 7.

In an embodiment, the first golden finger 82 in the adapter plate 8 may include a switch golden finger and a signal golden finger. The second golden finger in the hard disk backplane 7 may also include a switch golden finger and a signal golden finger. The switch golden finger in the hard disk backplane 7 is electrically connected to the switch golden finger in the corresponding adapter plate 8, so that the adapter plate 8 can supply power to the corresponding hard disk backplane 7. The signal golden finger in the hard disk backplane 7 is electrically connected to the signal golden finger in the corresponding adapter plate 8, so that the adapter plate 8 and the corresponding hard disk backplane 7 can transmit data to each other. In this way, not only cables can be effectively saved, but also lower signal loss and transmission loss can be ensured, which is beneficial to reducing the power consumption of the storage server 100.

Alternatively, the support plate 212 may be opposite to the cover plate 32. The two side plates 211 may be provided on a side of the support plate 212 facing the cover plate 32. The computing tray 11 may be provided between the support plate 212 and the cover plate 32. For example, the motherboard 15 may be provided on a side of the computing tray 11 facing the support plate 212. Alternatively, the motherboard 15 may be provided on a side of the computing tray 11 away from the support plate 212.

Further, referring to FIG. 3, the storage tray 21 may further include an edge plate 213 provided on a side of the support plate 212 adjacent to the front opening 3a. The edge plate 213 is connected to the support plate 212 and the two side plates 211, so that the support plate 212, the two side plates 211, and the edge plate 213 cooperatively form the storage cavity 21b.

In an embodiment, the storage assembly 2 further includes a handle 214 provided on the storage tray 21, so as to facilitate pushing and pulling the storage tray 21 relative to the casing 3. The handle 214 may be provided on the side plate 211, the support plate 212 or the edge plate 213.

Further, in an embodiment, as shown in FIG. 4, the storage server 100 further includes at least two adapter support plates 8a. The adapter plates 8 are arranged on the adapter support plates 8a in a one-to-one correspondence. The support plate 212 has a first end surface 212a forming an angle with the second direction. In an embodiment, the first end surface 212a is perpendicular to the second direction. The support plate 212 is provided with at least two adapter grooves 21d and at least two connecting ports 21c. Each adapter groove 21d extends along the second direction, and an end of each adapter groove 21d extends through the first end surface 212a. The connecting ports 21c and the adapter grooves 21d are in a one-to-one correspondence, and the adapter grooves 21d are in communication with the storage cavity 21b through the corresponding connecting ports 21c.

The adapter support plates 7a and the adapter grooves 21d are in a one-to-one correspondence, and each adapter support plate 7a can be pluggably mounted into the corresponding adapter groove 21d. The first golden finger 82 corresponds to the corresponding connecting port 21c, and the second golden finger 62 can be electrically connected to the corresponding first golden finger 82 through the connecting port 21c. When the adapter plate 8a is pushed and pulled, the adapter plate 8 can be effectively moved relative to the support plate 212, so that the adapter plate 8 can be reliably inserted into or removed from the adapter groove 21d. When the adapter plate 8 is inserted in the adapter groove 21d, the first golden finger 82 can be electrically connected to the corresponding second golden finger through the connecting port 21c, so as to ensure data transmission between the adapter plate 8 and the hard disk backplane 7. When the adapter plate 8 is removed from the adapter groove 21d, the first golden finger 82 can be electrically disconnected from the second golden finger, so as to facilitate maintenance of the adapter plate 8. Therefore, the adapter plate 8 can be separately plugged and unplugged for maintenance as an independent module, thereby improving improve the maintenance efficiency and the disassembly and assembly efficiency.

In an embodiment, referring to FIG. 1 and FIGS. 4 to 6, the computing assembly 1 includes a host bus adapter (HBA) 13, and the host bus adapter 13 is provided on the motherboard 15 and is electrically connected to the motherboard 15. In an embodiment, the host bus adapter 13 is a circuit board that provides input and output processing and physical connection functions between the motherboard 15 and the storage unit 22. The host bus adapter 13 can reduce a load of a processor in the motherboard 15 when performing tasks such as data storage and search, thereby improving the performance of the server. The storage server 100 further includes a cable fixing base 9 pluggably mounted on the support plate 212 along the first direction. The cable fixing base 9 includes at least two third golden fingers 91 spaced apart along the first direction. Each adapter plate 8 includes a fourth golden finger 81. The third golden fingers 91 are electrically connected to the fourth golden fingers 81 in a one-to-one correspondence. Each third golden finger 91 is connected to the host bus adapter 13 through a cable (not shown). In this way, the data transmission between the motherboard 15 and the hard disk 64 can be effectively ensured through the host bus adapter 13, the cable, the first golden finger 82, and the second golden finger, thereby ensuring that the server can reliably implement the corresponding functions.

It should be noted that, in order to ensure that the host bus adapter 13, the adapter plate 8, and the hard disk 64 in the storage server 100 can be adapted to each other, the host bus adapter 13 is configured in the computing assembly 1 only when the hard disks 64 in the storage server 100 are 3.5-inch hard disks (HDD). Similarly, when the hard disk 64 is the HDD and the host bus adapter 13 is configured in the computing assembly 1, the adapter plate 8 can be configured as an expander board adapted to the HDD, so that data from the motherboard 15 can be transmitted to the hard disk 64 through the host bus adapter 13, the expander board, and the hard disk backplane 7, thereby ensuring the reliability of the storage server 100 during operation.

Figure 6:
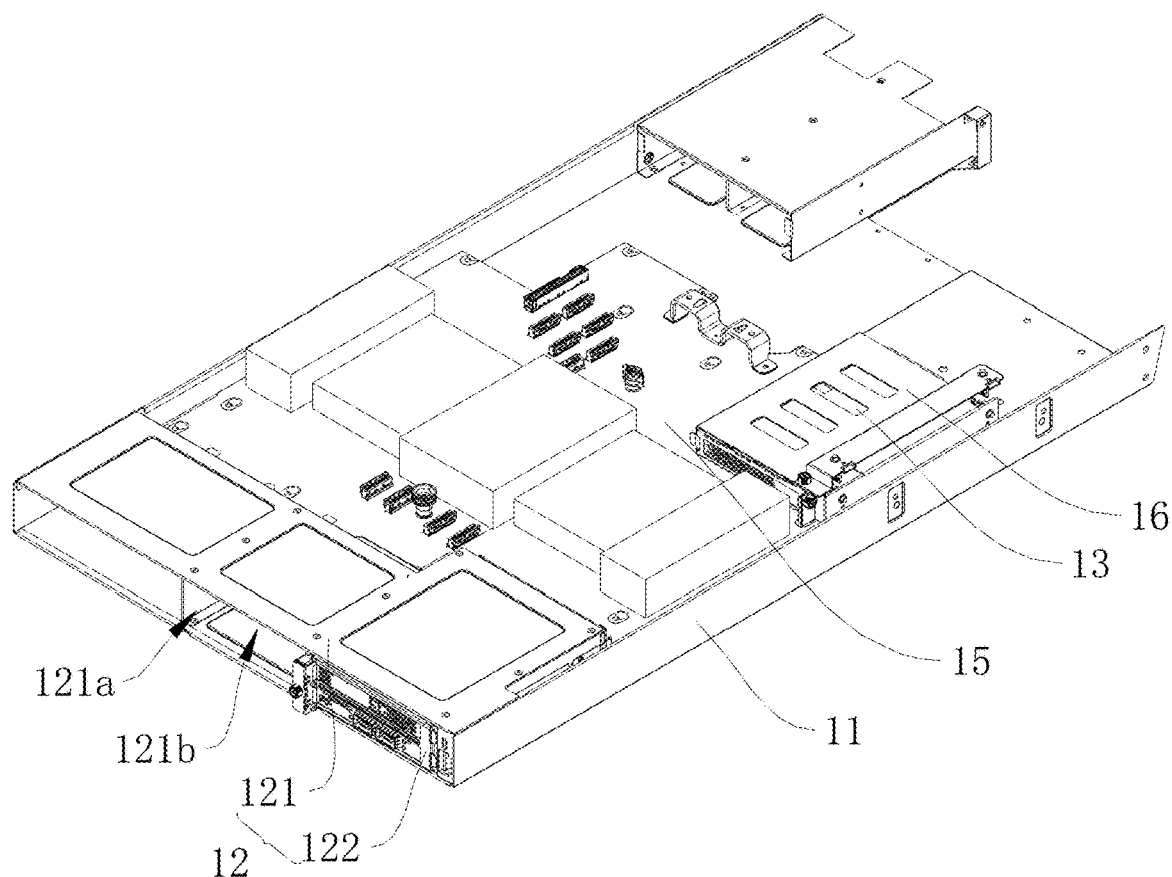
FIG. 6 is a perspective view of a computing assembly according to an embodiment.
Figure 7:
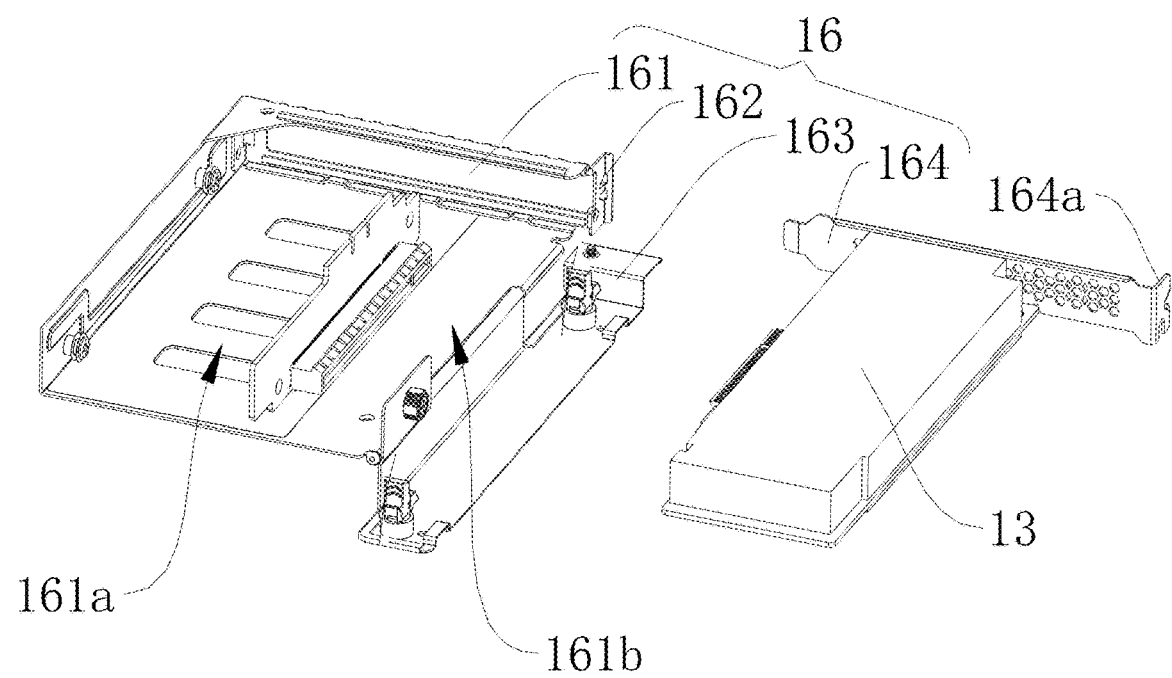
FIG. 7 is a perspective view illustrating a bus adapter disassembled from an adapter bracket according to an embodiment.
Figure 8:
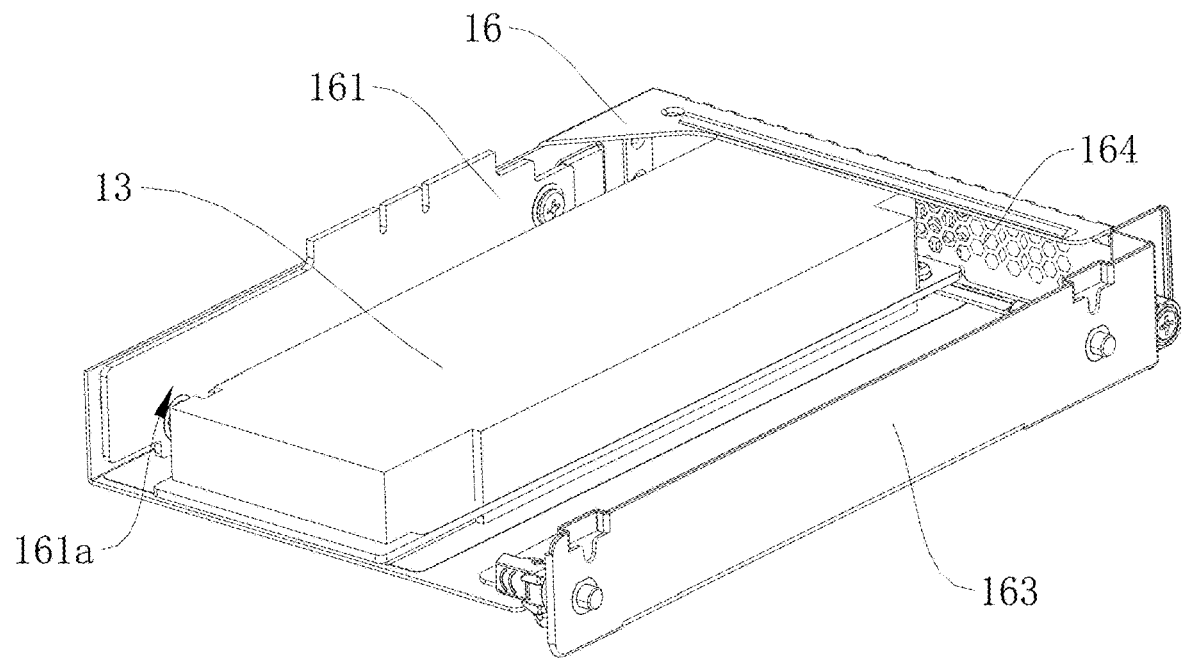
FIG. 8 is a perspective view illustrating the bus adapter assembled to the adapter bracket.

In an embodiment, referring to FIG. 6, FIG. 7 and FIG. 8, the computing assembly 1 includes an adapter bracket 16. The host bus adapter 13 is detachably provided in the adapter bracket 16. The adapter bracket 16 may be provided on the motherboard 15 and includes a support base 161, a locking base 162, a clamping bracket 164, and a locking mechanism 163. The support base 161 is provided with a support position 161a and a support opening 161b which are in communicated with each other. The locking seat 162 is provided on a side of the support base 161 provided with the support opening 161b. The host bus adapter 13 is provided on the clamping bracket 164. The clamping bracket 164 can move into and out of the support position 161a through the support opening 161b. The locking mechanism 163 is provided on the side of the support base 161 provided with the supporting opening 161b and can be locked with or unlocked from the locking base 162. The clamping bracket 164 includes a clamping portion 164a sandwiched between the locking base 162 and the locking mechanism 163. In this way, the clamping bracket 164 can be mounted in the support position 161a through the support opening 161b, and the locking base 162 and the locking mechanism 163 provided on the side of the support base 161 corresponding to the support opening 161b can clamp the clamping portion 164a. At this time, when the locking base 162 is locked to the locking mechanism 163, the host bus adapter 13 and the support base 161 are mounted to complete the assembly of the host bus adapter 13 and the adapter bracket 16. Therefore, the host bus adapter 13 can be easily assembled to and disassembled from the adapter bracket 16, which facilitates the maintenance of the host bus adapter 13. In addition, the arrangement of the third golden finger 91 and the fourth golden finger 81 enables the electrical connection between the cable and the adapter plate 8 without using an additional tool, which further ensures that the adapter plate 8 can be separately plugged and unplugged for maintenance as an independent module, and enables the disassembly and assembly between the cable and the adapter plate 8 to be more convenient.

In an embodiment, the host bus adapter 13 adopts a hot-plugging technology to facilitate disassembly and assembly, improve disassembly and assembly efficiency, and greatly shorten the maintenance time.

Further, in an embodiment, referring to FIG. 1, FIG. 4 and FIG. 5, the computing assembly 1 includes a signal relay 14 provided on the computing tray 11 and electrically connected to the motherboard 15. In an embodiment, the signal relay 14 is provided on the side of the motherboard 15 away from the front opening 3a. The storage server 100 further includes a cable fixing base 9 pluggably mounted on the support plate 212 along the first direction. The cable fixing base 9 includes at least two third golden fingers 91 spaced apart along the first direction. Each adapter plate 8 includes a fourth golden finger 81, and the third golden fingers 91 are electrically connected to the fourth golden fingers 81 in a one-to-one correspondence. Each third golden finger 91 is electrically connected to the signal relay 14 through a cable. In this way, the signal relay 14 can be used to increase a transmission distance of data in the cable, so as to reduce the loss of signal during transmission in the cable, and ensure the data transmission between the motherboard 15 and the hard disk 64, thereby ensuring that the server can reliably implement the corresponding functions. In addition, the arrangement of the third golden finger 91 and the fourth golden finger 81 enables the electrical connection between the cable and the adapter plate 8 without using an additional tool, which further ensures that the adapter plate 8 can be separately plugged and unplugged for maintenance as an independent module, and enables the disassembly and assembly between the cable and the adapter plate 8 to be more convenient.

In an embodiment, the signal relay 14 may include up to three retimer chips. The retimer chip is a signal conditioning chip, which is used for signal equalization and signal enhancement. The retimer chip is similar to a chip with an external signal interface. When the signal is transmitted through the retimer chip, the signal can be reconstructed through an internal clock of the retimer card, which can increase the signal transmission energy, and then continue to be transmitted, which can improve the reliability of the storage server 1. Therefore, the signal relay 14 can reduce the physical loss in the data transmission process, improve the signal quality and enhance the signal transmission distance, and ensure the reliability of communication at long distance, complex environment or high data rate.

It should be noted that, in order to ensure that the signal relay 14, the adapter plate 8, and the hard disk 64 in the storage server 100 can be adapted to each other, when a part of the hard disks 64 in the storage server 100 are NVMe SSDs (non-volatile memory express solid-state disks), the signal relay 14 needs to be configured in the computing assembly 1. Similarly, when the signal relay 14 is configured in the computing assembly 1 and a part of the hard disks 64 are NVMe SSDs, the adapter plate 8 may be configured as a switch board or a carrier board, so that data on the motherboard 15 can be transmitted to the hard disk 64 through the signal relay 14, the adapter plate 8, and the hard disk backplane 7, thereby ensuring the reliability of the storage server 100 during operation.

In an embodiment, both the number of retimer cards and the type of the adapter plate 8 need to be configured according to the number of NVMe SSDs in the storage assembly 2. For example, when the hard disks 64 in the storage assembly 2 are NVMe SSDs, and sixty hard disks 64 are provided, three retimer chips may be provided, and the adapter plate 8 is a switch board. When the sixty hard disks 64 of the storage assembly 2 include both 3.5-inch hard disks and NVMe SSDs, one or two retimer cards may be provided, and the adapter plate 8 may be a carrier board.

In an embodiment, referring to FIG. 2 and FIG. 4, the support plate 212 further has a second end surface 212b away from the front opening 3a. The support plate 212 is further provided with a cable slot 21f extending along the first direction, one end of the cable slot 21f extends through the second end surface 212b. The cable slot 21f is arranged on a side of each adapter groove 21d away from the first end surface 212a and is in communication with each adapter groove 21d. The cable fixing base 9 is pluggably mounted in the cable slot 21f. In this way, when the cable fixing base 9 is plugged in the cable slot 21f, the cable fixing base 9 can be located at one end of the adapter plate 8, so that the third golden finger 91 in the cable fixing base 9 can be electrically connected to the fourth golden finger 81 in the corresponding adapter plate 8, so as to ensure that data transmission can be performed between the adapter plate 8 and the cable. When the adapter plate 8 is removed, the third golden finger 91 is electrically disconnected from the fourth golden finger 81, so that the adapter plate 8 can be independently maintained. When the cable fixing base 9 is removed from the cable slot 21f, the cable fixing base 9 can be maintained. Therefore, the cable fixing base 9 can be separately plugged and unplugged for maintenance as an independent module, which can improve the maintenance efficiency and the disassembly and assembly efficiency.

Specifically, when the cable fixing base 9 and the adapter plate 8 are assembled, the cable fixing base 9 is firstly inserted into the cable slot 21f, and then the corresponding adapter plate 8 is inserted into each adapter groove 21d, so that when the adapter plate 8 is inserted into the adapter groove 21d, the third golden finger 91 and the fourth golden finger 81 can be effectively electrically connected.

In an embodiment, referring to in FIG. 2, the storage server 100 further includes a cable management frame 5, which is received in the casing cavity 3b and located at a side of the storage assembly 2 away from the front opening 3a. The cable is provided on the cable management frame 5. The cable management frame 5 includes a plurality of frame bodies 51 that are sequentially hinged. Two frame bodies 51 located at opposite ends of the cable management frame 5 are hinged to the casing 3 and the storage tray 21, respectively, and the storage tray 21 can drive the plurality of frame bodies 51 to be folded or unfolded when moving along the first direction relative to the casing 3. In this way, when the storage tray 21 slides relative to the casing 3 along the first direction, the folding or unfolding of the plurality of frame bodies 51 can also drive the cable to be folded or unfolded, so that when the storage tray 21 moves, the adapter plate 8 and the motherboard 15 can still be electrically connected through the cable, thus ensuring that data can be reliably transmitted between the motherboard 15 and the adapter plate 8. At the same time, the arrangement of the cable management frame 5 can also ensure the orderliness when the cable is unfolded or folded, so as to prevent the storage tray 21 from being pushed into or pulled out of the casing cavity 3b smoothly due to the interference of the cable.

In an embodiment, as shown in FIG. 2, FIG. 3 and FIG. 9 to FIG. 11, the storage assembly 2 includes at least two backplane support plates 72. The at least two backplane support plates 72 are connected to the at least two hard disk backplanes 7 in a one-to-one correspondence. Two ends of each backplane support plate 72 are connected to the corresponding storage tray 21. In an embodiment, two ends of the backplane support plate 72 are connected to the two side plates 211, respectively. The storage unit 22 further includes a plurality of hard disk assemblies 6 arranged along the second direction. Each hard disk assembly 6 is pluggably received in the storage cavity 21b.

Each hard disk assembly 6 includes a mounting bracket 61, an elastic member 66, a pressing member 67, and the hard disk 64. The mounting bracket 61 is engaged with the corresponding backplane support plate 72. The mounting bracket 61 is provided with a first opening 61a and a first mounting position 61b that are in communication with each other. The hard disk 64 can move into and out of the first mounting position 61b through the first opening 61a. One end of the elastic member 66 is provided on the mounting bracket 61, and the other end of the elastic member 66 includes an engagement portion 661. The pressing member 67 is movably provided on the mounting bracket 61 and is configured to press the engagement portion 661. The hard disk 64 includes a locking portion 641 configured to be locked with or unlock from with the locking portion 641. In this way, the hard disk 64 can be mounted in the storage cavity 21b through the hard disk assembly 6, so that the hard disk 64 can remain relatively fixed to the corresponding hard disk backplane 7 under the action of the mounting bracket 61, thereby ensuring the reliability of the connection between the hard disk 64 and the hard disk backplane 7, and ensuring the stability of the storage server 100. When the hard disk 64 needs to be maintained, it is only necessary to remove the hard disk assembly 6 corresponding to the hard disk 64 to be maintained from the backplane support plate 72, so that the hard disk 64 can be removed from the storage cavity 21b, and the hard disk 64 can be independently maintained, which can greatly improve work efficiency.

Figure 9:
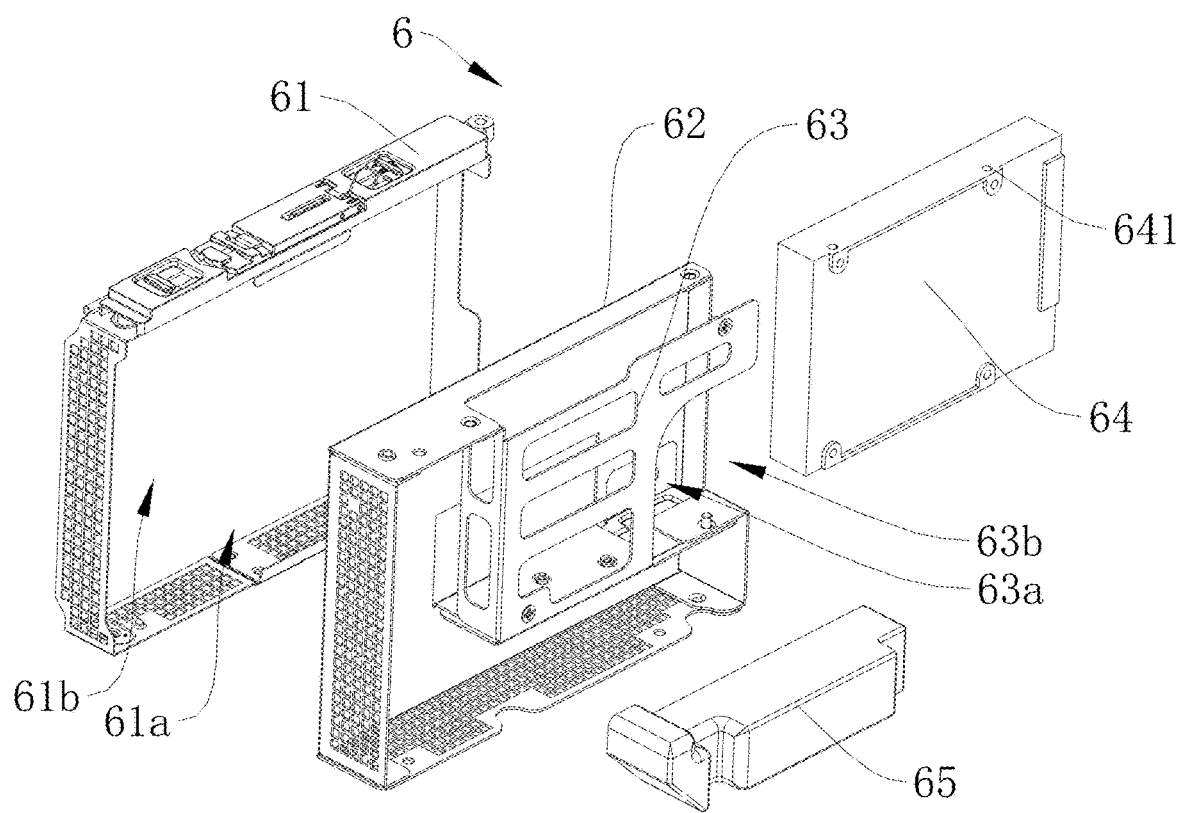
FIG. 9 is an exploded view of a hard disk assembly according to an embodiment.
Figure 10:
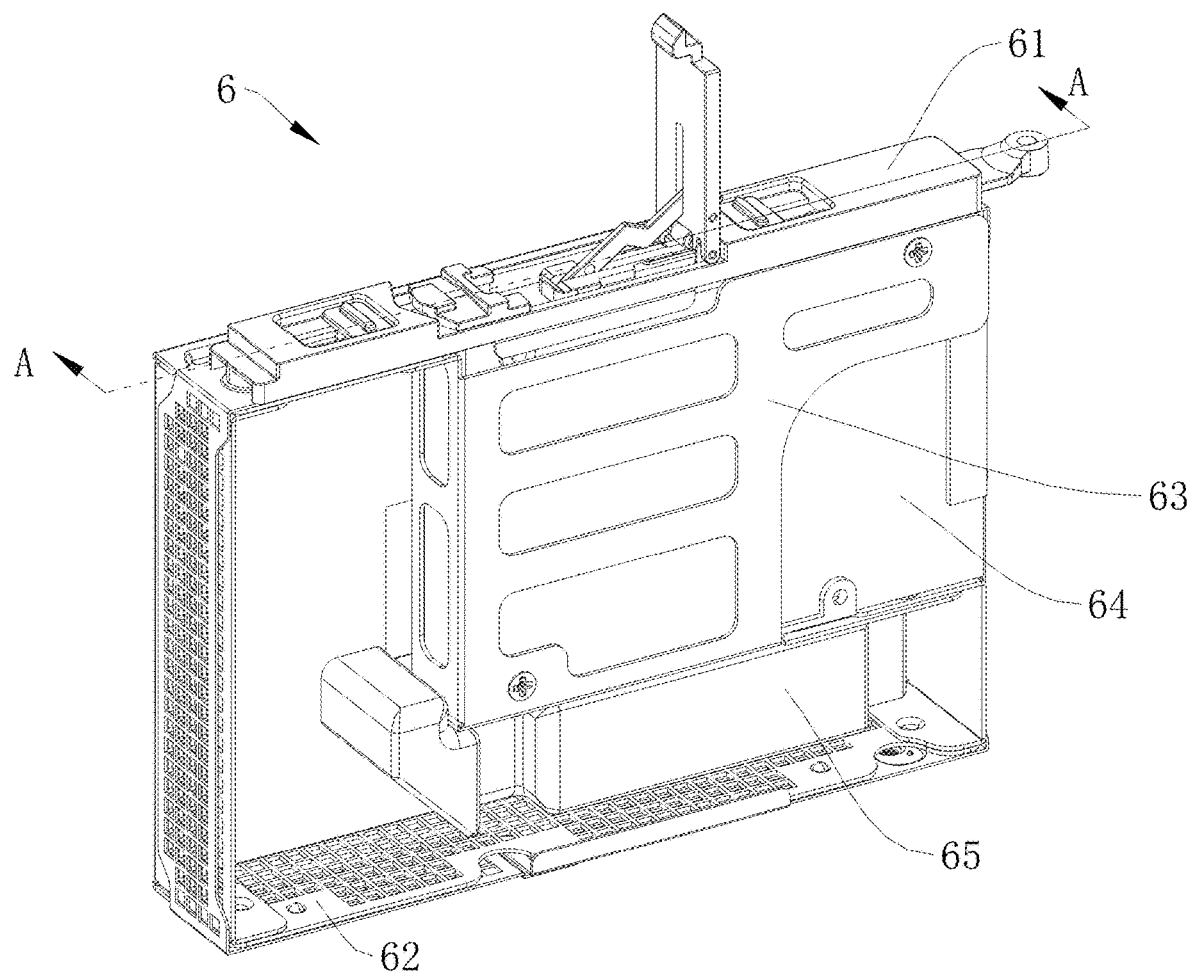
FIG. 10 is a perspective view of the hard disk assembly of FIG. 9.
Figure 11:
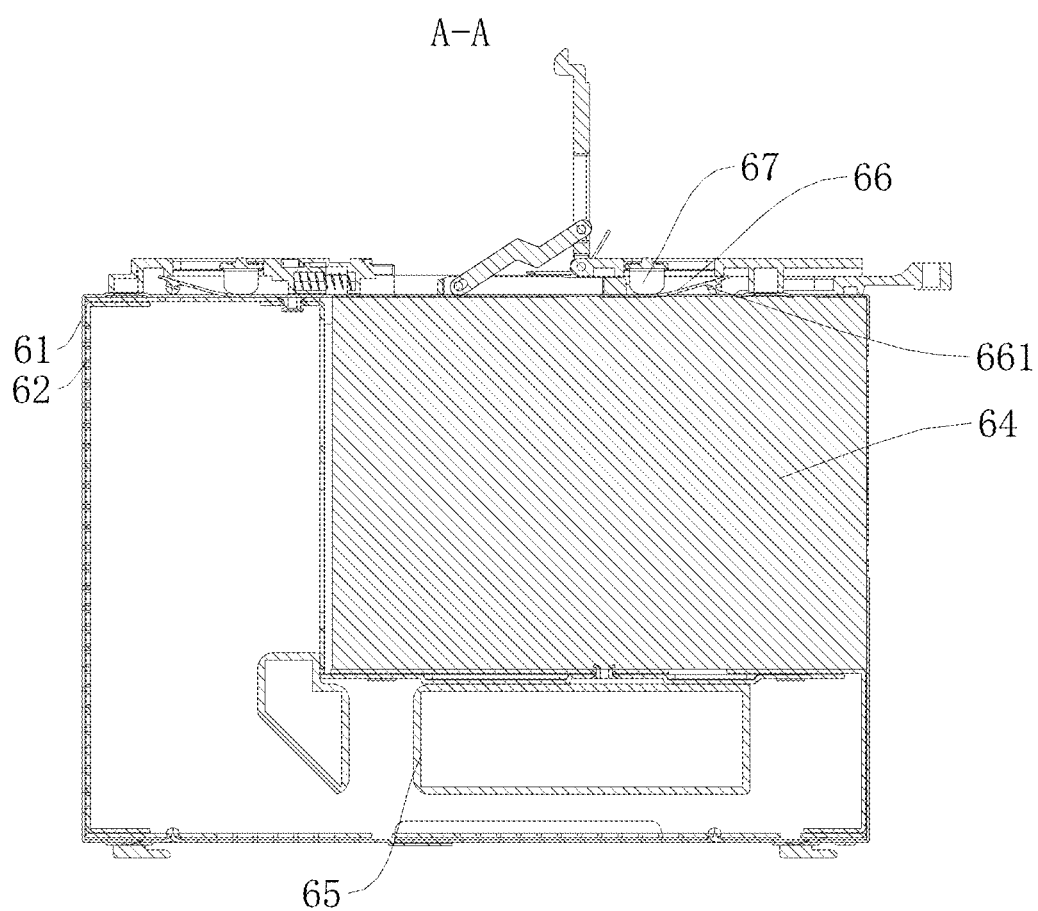
FIG. 11 is a cross-sectional view taken along the line V-V of FIG. 10.

In addition, as shown in FIGS. 9 to 11, when assembling the hard disk assembly 6, the hard disk 64 enters the first mounting position 61b from the first opening 61a of the mounting bracket 61, and then the pressing member 67 is controlled to move, so that the pressing member 67 can press the locking portion 661 of the elastic member 66, and the engagement portion 661 can move under the pressing action and lock to the locking portion 641 of the hard disk 64, thereby completing the mounting of the hard disk 64. In this way, the engagement portion 661 can be locked with or unlock from the hard disk 64 by only controlling the movement of the pressing member 67, and thus the efficiency of assembly and disassembly between the hard disk 64 and the mounting bracket 61 can be effectively improved.

In an embodiment, as shown in FIG. 3, the backplane support plate 72 is provided with a plurality of hard disk grooves 74 and a plurality of communication grooves. The plurality of hard disk grooves 74 are arranged along the second direction. The plurality of hard disk assemblies 6 are mounted in the plurality of hard disk grooves 74 in a one-to-one correspondence. The plurality of communication grooves and the plurality of hard disk grooves 74 are in a one-to-one correspondence, and the backplane connector 71 of the hard disk backplane 7 opposite to the backplane support plate 72 is electrically connected to the corresponding hard disk connector through the communication groove. In this way, when the hard disk assembly 6 is mounted in the storage cavity 21b, the hard disk connector in the hard disk 64 can be connected to the backplane connector 71 in the corresponding hard disk backplane 7, so as to ensure that the hard disk 64 is electrically connected the hard disk backplane 7. At the same time, it can also ensure that the hard disk assembly 6 can remain relatively stable relative to the hard disk backplane 7.

Further, in an embodiment, referring to FIGS. 9 to 11, the hard disk assembly 6 further includes a fixing bracket 62 and a frame body 63. The fixing bracket 62 is capable of moving into and out of the first mounting position 61b through the first opening 61a. The frame body 63 is detachably provided on the fixing bracket 62 and is provided with a second opening 63b and a second mounting position 63a that are communication with each other. The hard disk 64 is capable of moving into and out of the second mounting position 63a through the second opening 63b. In this way, the hard disk 64 can enter the second mounting position 63a through the second opening 63b of the frame body 63, and then the fixing bracket 62 with the frame body 63 is mounted into the first mounting position 61b through the first opening 61a of the mounting bracket 61, so that the mounting of the hard disk 64 can be completed. Therefore, the convenience of the assembly of the hard disk assembly 6 can be effectively ensured. The housing 63 can protect the hard disk 64 at the second mounting position 63a to prevent the hard disk 64 from being damaged due to collision with an external device.

In addition, due to the arrangement of the frame body 63 and the fixing bracket 62, the hard disks 64 of different types and sizes can share the same mounting bracket 61, so that the hard disks 64 of different types and sizes can be conveniently inserted into the storage cavity 21b of the storage server 100 through the hard disk assembly 6, and can be reliably connected to the hard disk backplane 7. Therefore, the cooperation among the frame body 63, the fixing bracket 62, and the mounting bracket 61 enables the storage server 100 to be compatible with different types of hard disks 64, thereby facilitating increasing the application scenarios of the storage server 100.

Figure 12:
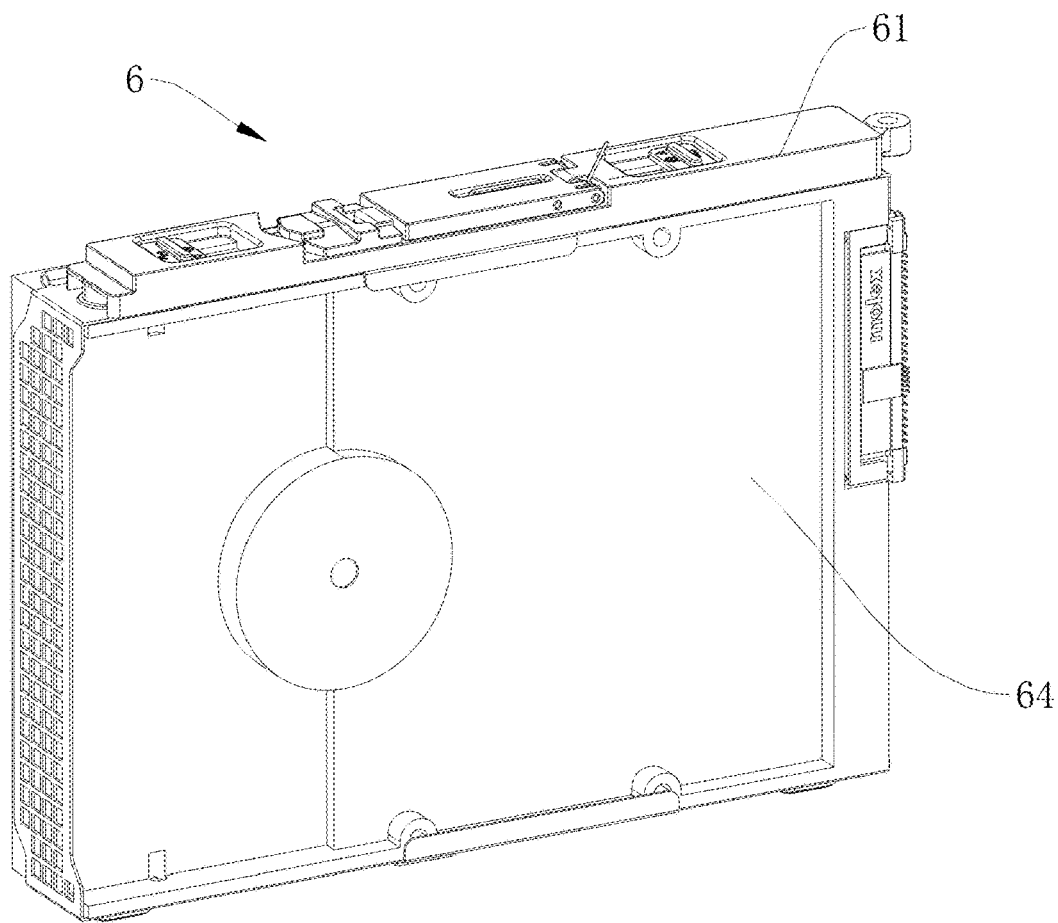
FIG. 12 is a perspective view of a hard disk assembly according to another embodiment.

It should be noted that, since the fixing bracket 62 is detachably connected to the mounting bracket 61, and the fixing bracket 62 is detachably connected to the frame body 63, it is possible to select whether to mount the fixing bracket 62 and whether to replace the frame body 63 according to a size of the hard disk 64, so that the mounting bracket 61 can accommodate the hard disk 64 of different types and sizes. Therefore, the universal applicability of the hard disk assembly 6 is improved, the number of future mold products is reduced, and the production cost is reduced. For example, when the hard disk 64 is a 3.5-inch hard disk with relatively large size, it can be directly mounted in the first mounting position 61b without providing the fixing bracket 62 and the frame body 63, as shown in FIG. 12. When the hard disk 64 is a U.2 solid state disk or E3.S solid state disk with a relatively small size, it can be mounted on the mounting bracket 61 through the fixing bracket 62 and the frame body 63, as shown in FIG. 10.

Further, in an embodiment, the hard disk assembly 6 further includes an air guiding cover 65 provided in the fixing bracket 62, and the air guiding cover 65 is attached to the frame 63, so as to avoid air leakage and ensure a heat dissipation effect.

In an embodiment, both the mounting bracket 61 and the fixing bracket 62 are further provided with a plurality of heat dissipation holes configured to dissipate heat from the adapter plate 8 provided on the support plate 212.

In an embodiment, as shown in FIG. 1 and FIG. 6, the computing assembly 1 further includes an expansion module 12. The expansion module 12 includes an expansion bracket 121 and an expansion assembly 122. The expansion bracket 121 is provided on the computing tray 121 and is located on a side of the motherboard 121 adjacent to the front opening 3a. The expansion bracket 121 is provided with a first mounting opening 121a and a first mounting cavity 121b that are in communication with each other. The first mounting opening 121a is located on a side of the first mounting cavity 121b away from the motherboard 15 and is in communication with the front opening 3a. The expansion assembly 122 is detachably mounted in the first mounting cavity 121b through the first mounting opening 121a and is electrically connected to the motherboard 122. The expansion assembly 122 includes an expansion interface on a side thereof facing the first mounting opening 121a, and the expansion interface is configured to be connected to an external device. In this way, the external device can be connected to the storage server 100 through the expansion interface, so as to transmit data between the external device and the motherboard 15 through the expansion assembly, thereby improving the expansion performance of the storage server 100. The first mounting opening 121a corresponds to the front opening 3a, so that when the external device is inserted into the expansion interface, space of the storage server 100 in the third direction will not be occupied. Therefore, when the storage server 100 is mounted in a cabinet, additional height space is not occupied. Since the expansion assembly 122 is detachably mounted in the first mounting cavity 121b, the expansion assembly 122 can be easily plugged and unplugged for replacement, so as to facilitate maintenance or replacement of the expansion assembly 122.

The expansion assembly 122 includes, but is not limited to, an NVMe (Non-Volatile Memory express) card, a single-bandwidth PCIE (Peripheral Component Interconnect Express that is a high-speed serial computer expansion bus standard) card, a dual-bandwidth PCIE card, a data processing unit (DPU) card or an OCP (Open Compute Project) 3.0 card, etc.

In an embodiment, the first mounting opening 121a and the first mounting cavity 121b may form an expansion cavity. The expansion bracket 121 may be provided with a plurality of expansion cavities that are spaced apart along the second direction, and at least one expansion assembly 122 is received in each expansion cavity. In this way, when the plurality of expansion interfaces in the expansion assembly 12 are connected to different types of external devices, the storage server 100 can be connected to different types of external devices at the same time, so as to greatly improve the expansion performance of the storage service 100.

For example, the plurality of expansion assemblies 122 may be a combination of the above different types of expansion assemblies 122. For example, the plurality of expansion assemblies 122 may include four NVMe cards, a single-bandwidth PCIE card, and a DPU card. Alternatively, the plurality of expansion assemblies 122 may include six NVMe cards and two OCP 3.0 cards. Alternatively, the plurality of expansion assemblies 122 may include four NVMe cards, two dual-bandwidth PCIE cards, and a DPU card.

Figure 13:
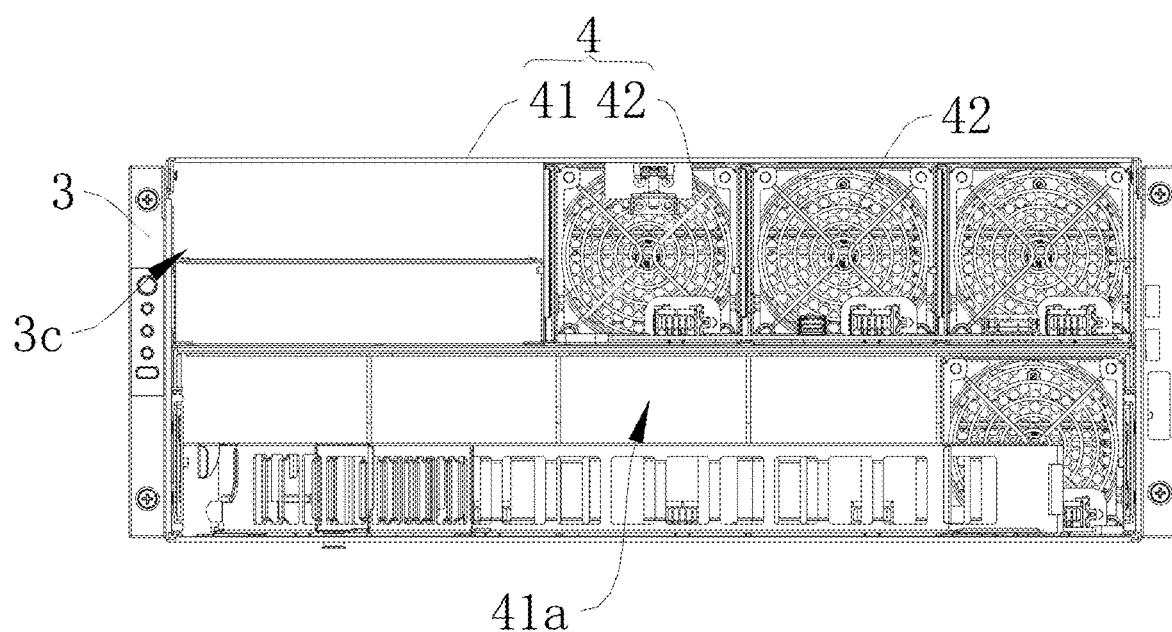
FIG. 13 is a side view of a heat dissipation assembly in a casing cavity according to an embodiment.

In an embodiment, referring to FIG. 1, FIG. 2 and FIG. 13, the casing 3 is further provided with a rear opening 3c in communication with the casing cavity 3b and opposite to the front opening 3a. The storage server 100 further includes a heat dissipation assembly 4 including a heat dissipation bracket 41 and a fan assembly 42. The heat dissipation bracket 41 is received in the casing cavity 3b and is located on a side of the storage assembly 2 and a side of the computing assembly 1 that are both adjacent to the rear opening 3c. The heat dissipation bracket 41 is provided with a second mounting cavity 41a extending therethrough along the first direction. The fan assembly 42 is detachably mounted in the second mounting cavity 41a. The fan assembly 42 is configured to draw airflow from the casing cavity 3b or blow airflow into the casing cavity 3b through the rear opening 3c. In this way, when the fan assembly 42 works, the generated airflow can dissipate heat from the computing assembly 1 and the storage assembly 2, so as to prevent the computing assembly 1 and the storage assembly 2 from being damaged due to high temperature, which is conducive to ensuring the working reliability of the storage server 100. The heat dissipation assembly 4 is located on the side of the storage assembly 2 adjacent to the rear opening 3c, so that the heat dissipation assembly 4 does not block the sliding of the storage tray 21. Meanwhile, when the airflow generated by the heat dissipation assembly 4 moves along the first direction, the heat dissipation effect on the storage assembly 2 can be effectively ensured. In addition, the fan assembly 42 is detachably mounted in the second mounting cavity 41A, which facilitates the maintenance of a single fan assembly 42, thereby increasing the maintenance efficiency.

In an embodiment, as shown in FIG. 1 and FIG. 2, the cable management frame 5 may be provided between the storage assembly 2 and the heat dissipation assembly 4, and the cable management frame 5 is provided with a cable arrangement opening for airflow to flow through, so that the cable management frame 5 does not block the airflow flowing along the first direction, thereby ensuring the heat dissipation effect and the reliability of the storage server 100.

Figure 14:
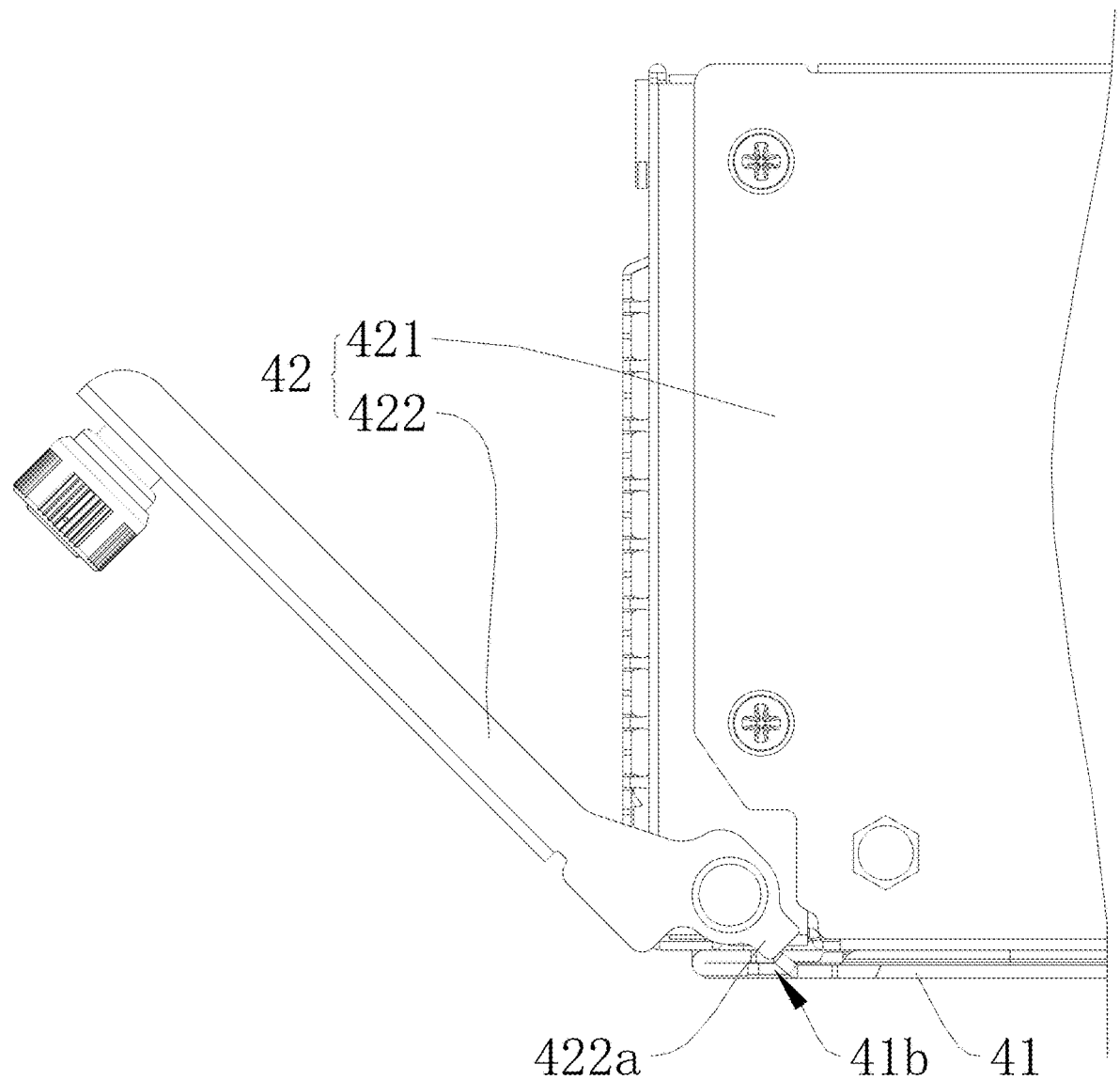
FIG. 14 is a partial enlarged view of the heat dissipation assembly before assembly according to an embodiment.
Figure 15:
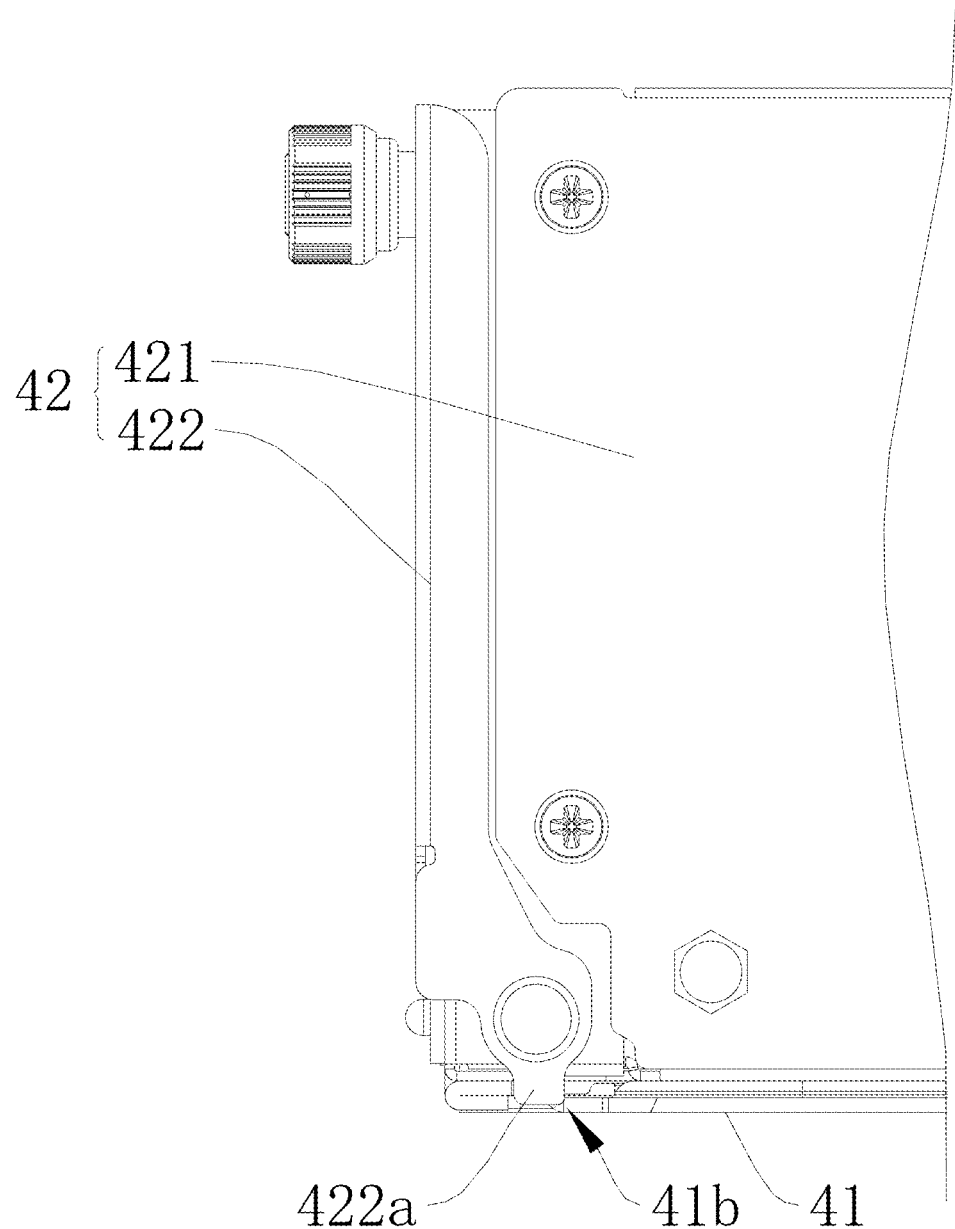
FIG. 15 is similar to FIG. 14, but illustrating the heat dissipation assembly being assembled.

Further, in an embodiment, as shown in FIGS. 13 to 15, a cavity wall of the second mounting cavity 41a is provided with an assembly groove 41b. The fan assembly 42 includes a fan body 421 and an assembly member 422 rotatably provided on the fan body 421. The fan body 421 is capable of moving into and out of the second mounting cavity 41a through an end of the second mounting cavity 41a adjacent to the rear opening 3c. A rotation plane of the assembly member 422 is parallel to a mounting direction and a removing direction of the fan body 421. The assembly member 422 includes an assembly protrusion 422a at an end thereof. The assembly protrusion 422a can be engaged in the assembly groove 41b and abut against a side wall of the assembly groove 41b away from the storage assembly 2. In this way, when the fan body 421 is mounted in the second mounting cavity 41a, a part of the assembly protrusion 422a can first enter the assembling groove 41b. At this time, the assembly member 422 is rotated to enable the assembly protrusion 422a to rotate toward the side wall of the assembly groove 41b away from the storage assembly 2, so that the assembly protrusion 422a can abut against the side wall of the assembly groove 41b away from the storage assembly 2, thereby completing the assembly of the assembly protrusion 422a and the assembly groove 41b and the locking of the fan body 421. Therefore, the fan assembly 42 and the heat dissipation bracket 41 can be conveniently assembled and disassembled through the assembly member 422, which is conducive to improving the maintenance efficiency of the fan assembly 42.

In an embodiment, a plurality of second mounting cavities 41a and a plurality of fan assemblies 42 are provided, and the fan assemblies 42 are detachably mounted in the second mounting cavities 41a in a one-to-one correspondence. For example, eight second mounting cavities 41a and eight fan assemblies 42 are provided, in which five second mounting cavities 41a are spaced apart along the second direction to form a first cavity group, and the rest three second mounting cavities 41a are spaced apart along the second direction to form a second cavity group. The first cavity group and the second cavity group are stacked in the third direction, the first cavity group is located on a side of the second cavity group adjacent to the support plate 212, and the eight fan assemblies 42 are mounted in the eight second mounting cavities 41a in a one-to-one correspondence. In this way, the heat dissipation assembly 4 can effectively dissipate heat from the computing assembly 1 and the storage assembly 2, thereby ensuring the reliability of the storage server 100.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A storage server, comprising:
a casing provided with a casing cavity and a front opening in communication with the casing cavity;
a storage assembly comprising a storage tray, at least two storage units, and at least two hard disk backplanes, wherein the storage tray is slidably connected to the casing and is capable of moving into and out of the casing cavity in a first direction through the front opening, the storage tray is provided with a storage cavity, the at least two hard disk backplanes are spaced apart along the first direction in the storage cavity, the at least two hard disk backplanes and the at least two storage units are provided in a one-to-one correspondence, each hard disk backplane is located on a side of the corresponding storage unit in the first direction, each storage unit comprises a plurality of hard disks arranged along a second direction, each hard disk is pluggably received in the storage cavity and is electrically connected to the corresponding hard disk backplane, and the second direction forms an angle with the first direction; and
a computing assembly received in the casing cavity and is stacked on top of the storage assembly in a third direction perpendicular to both the first direction and the second direction, wherein the computing assembly comprises a computing tray connected to the casing and a motherboard provided on the computing tray and electrically connected to the at least two hard disk backplanes; and the storage tray comprises a support plate extending along the first direction and two side plates respectively provided on opposite sides of the support plate in the second direction to form the storage cavity, wherein the storage server further comprises at least two adapter plates, each adapter plate is pluggably inserted between the support plate and the sides plate along the second direction, each adapter plate is electrically connected to the motherboard, each adapter plate comprises a first golden finger, each hard disk backplane comprises a second golden finger electrically connected to the first golden finger, the at least two adapter plates and the at least two hard disk backplanes are in a one-to-one correspondence.

2. The storage server according to claim 1, wherein the computing assembly comprises a host bus adapter provided on the motherboard and electrically connected to the motherboard,
wherein the storage server further comprises a cable fixing base removably mounted on the support plate along the first direction, the cable fixing base comprises at least two third golden fingers spaced apart along the first direction, each adapter plate comprises a fourth golden finger, the at least two third golden fingers are electrically connected to fourth golden fingers of the at least two adapter plates in a one-to-one correspondence, and each third golden finger is connected to the host bus adapter through a cable.

3. The storage server according to claim 1, wherein the computing assembly comprises a signal relay provided on the computing tray and electrically connected to the motherboard,
wherein the storage server further comprises a cable fixing base removably mounted on the support plate along the first direction, the cable fixing base comprises at least two third golden fingers spaced apart along the first direction, each adapter plate comprises a fourth golden finger, the at least two third golden fingers are electrically connected to fourth golden fingers of the at least two adapter plates in a one-to-one correspondence, and each third golden finger is connected to the signal relay through a cable.

4. The storage server according to claim 2, further comprising a cable management frame received in the casing cavity and located at a side of the storage assembly away from the front opening, the cable is provided on the cable management frame, the cable management frame comprises a plurality of frame bodies that are sequentially hinged, two frame bodies located at opposite ends of the cable management frame are hinged to the casing and the storage tray, respectively, and the storage tray is capable of driving the plurality of frame bodies to be folded or unfolded when moving along the first direction relative to the casing.

5. The storage server according to claim 1, wherein the storage assembly comprises at least two backplane support plates connected to the at least two hard disk backplanes in a one-to-one correspondence, two ends of each backplane support plate are connected to the corresponding storage tray, the storage unit further comprises a plurality of hard disk assemblies arranged along the second direction, each hard disk assembly is pluggably received in the storage cavity, each hard disk assembly comprises a mounting bracket, an elastic member, a pressing member, and the hard disk, the mounting bracket is engaged with the corresponding backplane support plate, the mounting bracket is provided with a first opening and a first mounting position that are in communication with each other, the hard disk is capable of moving into and out of the first mounting position through the first opening, one end of the elastic member is provided on the mounting bracket, another end of the elastic member comprises an engagement portion, the pressing member is movably provided on the mounting bracket and is configured to press the engagement portion, the hard disk comprises a locking portion, and the engagement portion is configured to be locked with or unlock from the locking portion.

6. The storage server according to claim 5, wherein the hard disk assembly further comprises a fixing bracket and a frame body, the fixing bracket is capable of moving into and out of the first mounting position through the first opening, the frame body is detachably provided on the fixing bracket and is provided with a second opening and a second mounting position that are communication with each other, and the hard disk is capable of moving into and out of the second mounting position through the second opening.

7. The storage server according to claim 1, wherein four storage units and four hard disk backplanes are provided, the four storage units are evenly spaced apart in the storage cavity along the first direction, and each storage unit comprises fifteen hard disks arranged along the second direction.

8. The storage server according to claim 1, wherein the computing assembly further comprises an expansion module, the expansion module comprises an expansion bracket and an expansion assembly, the expansion bracket is provided on the computing tray and is located on a side of the motherboard adjacent to the front opening, the expansion bracket is provided with a first mounting opening and a first mounting cavity that are in communication with each other, the first mounting opening is located on a side of the first mounting cavity away from the motherboard and is communication with the front opening, the expansion assembly is detachably mounted in the first mounting cavity through the first mounting opening and is electrically connected to the motherboard, and the expansion assembly comprises an extension interface on a side thereof facing the first mounting opening configured to be connected to an external device.

9. The storage server according to claim 1, wherein the casing is further provided with a rear opening in communication with the casing cavity and opposite to the front opening,
wherein the storage server further comprises a heat dissipation assembly, the heat dissipation assembly comprises a heat dissipation bracket and a fan assembly, the heat dissipation bracket is received in the casing cavity and is located on a side of the storage assembly and a side of the computing assembly that are both adjacent to the rear opening, the heat dissipation bracket is provided with a second mounting cavity extending therethrough along the first direction, the fan assembly is detachably mounted in the second mounting cavity, and the fan assembly is configured to draw airflow from the casing cavity or blow airflow into the casing cavity through the rear opening.

10. The storage server according to claim 9, wherein a cavity wall of the second mounting cavity is provided with an assembly groove, the fan assembly comprises a fan body and an assembly member rotatably provided on the fan body, the fan body is capable of moving into and out of the second mounting cavity through an end of the second mounting cavity adjacent to the rear opening, a rotation plane of the assembly member is parallel to a mounting direction and a removing direction of the fan body, and the assembly member comprises an assembly protrusion at an end thereof engaged in the assembly groove and abutting against a side wall of the assembly groove away from the storage assembly.

* * * * *